(12) United States Patent
Lewis et al.

(10) Patent No.: US 8,321,293 B2
(45) Date of Patent: Nov. 27, 2012

(54) SYSTEMS AND METHODS FOR MARKETPLACE LISTINGS USING A CAMERA ENABLED MOBILE DEVICE

(75) Inventors: Alan Lewis, Santa Clara, CA (US); Ken Sun, Palo Alto, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 13/175,641

(22) Filed: Jul. 1, 2011

(65) Prior Publication Data

US 2011/0264549 A1      Oct. 27, 2011

Related U.S. Application Data

(63) Continuation of application No. 12/262,012, filed on Oct. 30, 2008, now Pat. No. 7,991,646.

(51) Int. Cl.
G06Q 30/00      (2012.01)
(52) U.S. Cl. ............... 705/26.1; 705/26.3; 705/27.1; 705/27.2
(58) Field of Classification Search ............... 705/26, 705/27, 37, 26.1, 26.3, 27.1
See application file for complete search history.

(56) References Cited

U.S. PATENT DOCUMENTS

| | | |
|---|---|---|
| 5,546,475 A | 8/1996 | Bolle et al. |
| 5,781,899 A | 7/1998 | Hirata |
| 5,845,265 A | 12/1998 | Woolston |
| 5,870,149 A | 2/1999 | Comroe et al. |
| 5,979,757 A | 11/1999 | Tracy et al. |
| 6,134,548 A | 10/2000 | Gottsman et al. |
| 6,157,435 A | 12/2000 | Slater et al. |
| 6,216,227 B1 | 4/2001 | Goldstein et al. |
| 6,266,651 B1 | 7/2001 | Woolston |
| 6,282,517 B1 | 8/2001 | Wolfe et al. |
| 6,366,696 B1 | 4/2002 | Hertz et al. |
| 6,393,427 B1 | 5/2002 | Vu et al. |
| 6,434,530 B1 | 8/2002 | Sloane et al. |
| 6,446,061 B1 | 9/2002 | Doerre et al. |
| 6,483,570 B1 | 11/2002 | Slater et al. |

(Continued)

FOREIGN PATENT DOCUMENTS

JP      200700172605      7/2007

(Continued)

OTHER PUBLICATIONS

"U.S. Appl. No. 10/979,604, Non Final Office Action mailed Dec. 20, 2010", 24 pgs.

(Continued)

*Primary Examiner* — Jeffrey A Smith
*Assistant Examiner* — Courtney Stopp
(74) *Attorney, Agent, or Firm* — Schwegman Lundberg & Woessner, P.A.

(57) ABSTRACT

Computer-implemented systems and methods for generating marketplace listings using a camera enabled mobile device are described in which a request is received via a camera enabled mobile device to list one or more sale items. An image taken by the camera enable mobile device and depicting the one or more sale items is received. Image recognition is performed on the received image to identify the one or more sale items. Based on the identification of the one or more sale items depicted in the image, a set of descriptive data is automatically generated. The one or more sale items are listed on a marketplace using the image and the automatically generated set of descriptive data.

22 Claims, 8 Drawing Sheets

U.S. PATENT DOCUMENTS

| | | | |
|---|---|---|---|
| 6,484,130 | B2 | 11/2002 | Dwyer et al. |
| 6,512,919 | B2 | 1/2003 | Ogasawara |
| 6,530,521 | B1 | 3/2003 | Henry |
| 6,549,913 | B1 | 4/2003 | Murakawa |
| 6,563,959 | B1 | 5/2003 | Troyanker |
| 6,587,835 | B1 | 7/2003 | Treyz et al. |
| 6,941,321 | B2 | 9/2005 | Schuetze et al. |
| 6,947,571 | B1 | 9/2005 | Rhoads et al. |
| 7,007,076 | B1 | 2/2006 | Hess et al. |
| 7,027,652 | B1 | 4/2006 | I'Anson |
| 7,347,373 | B2 | 3/2008 | Singh |
| 7,363,252 | B2 | 4/2008 | Fujimoto |
| 7,373,317 | B1 | 5/2008 | Kopelman et al. |
| 7,444,388 | B1 | 10/2008 | Svendsen |
| 7,460,735 | B1 | 12/2008 | Rowley et al. |
| 7,478,113 | B1 | 1/2009 | De Spiegeleer et al. |
| 7,593,602 | B2 | 9/2009 | Stentiford |
| 7,890,386 | B1 | 2/2011 | Reber |
| 7,921,040 | B2 | 4/2011 | Reber |
| 7,933,811 | B2 | 4/2011 | Reber |
| 7,991,646 | B2 | 8/2011 | Lewis et al. |
| 2001/0007981 | A1 | 7/2001 | Woolston |
| 2001/0049636 | A1 | 12/2001 | Hudda et al. |
| 2002/0042835 | A1 | 4/2002 | Pepin et al. |
| 2002/0049641 | A1 | 4/2002 | Kopelman et al. |
| 2002/0107737 | A1 | 8/2002 | Kaneko et al. |
| 2002/0138374 | A1 | 9/2002 | Jennings et al. |
| 2002/0165801 | A1 | 11/2002 | Stern et al. |
| 2002/0174035 | A1* | 11/2002 | Stern et al. ............... 705/27 |
| 2003/0083961 | A1 | 5/2003 | Bezos et al. |
| 2003/0126026 | A1 | 7/2003 | Gronberg et al. |
| 2003/0208409 | A1 | 11/2003 | Mault |
| 2004/0057627 | A1 | 3/2004 | Abe et al. |
| 2004/0099741 | A1 | 5/2004 | Dorai et al. |
| 2004/0205286 | A1 | 10/2004 | Bryant et al. |
| 2004/0262391 | A1 | 12/2004 | Harris et al. |
| 2005/0010486 | A1 | 1/2005 | Pandhe |
| 2005/0011957 | A1 | 1/2005 | Attia et al. |
| 2005/0022106 | A1 | 1/2005 | Kawai et al. |
| 2005/0055281 | A1 | 3/2005 | Williams |
| 2005/0083413 | A1 | 4/2005 | Reed et al. |
| 2005/0131799 | A1 | 6/2005 | Clay et al. |
| 2005/0162419 | A1 | 7/2005 | Kim et al. |
| 2005/0162523 | A1 | 7/2005 | Darrell et al. |
| 2005/0164273 | A1 | 7/2005 | Stoughton et al. |
| 2005/0283379 | A1 | 12/2005 | Reber |
| 2005/0283425 | A1 | 12/2005 | Grove et al. |
| 2006/0006238 | A1 | 1/2006 | Singh |
| 2006/0116935 | A1 | 6/2006 | Evans |
| 2006/0190350 | A1 | 8/2006 | Maas |
| 2006/0206584 | A1 | 9/2006 | Hyder et al. |
| 2006/0240862 | A1 | 10/2006 | Neven et al. |
| 2007/0030364 | A1 | 2/2007 | Obrador et al. |
| 2007/0043757 | A1 | 2/2007 | Benton et al. |
| 2007/0100713 | A1 | 5/2007 | Favero et al. |
| 2007/0118430 | A1 | 5/2007 | Wiseman et al. |
| 2007/0133947 | A1 | 6/2007 | Armitage et al. |
| 2007/0150403 | A1* | 6/2007 | Mock et al. ............... 705/37 |
| 2007/0172155 | A1 | 7/2007 | Guckenberger |
| 2007/0174341 | A1 | 7/2007 | Saripalli et al. |
| 2008/0004981 | A1 | 1/2008 | Gopalpur et al. |
| 2008/0037877 | A1 | 2/2008 | Jia et al. |
| 2008/0046738 | A1 | 2/2008 | Galloway et al. |
| 2008/0073423 | A1 | 3/2008 | Heit et al. |
| 2008/0082426 | A1 | 4/2008 | Gokturk et al. |
| 2008/0170810 | A1 | 7/2008 | Wu et al. |
| 2008/0177640 | A1 | 7/2008 | Gokturk et al. |
| 2008/0201368 | A1 | 8/2008 | Lee et al. |
| 2008/0205764 | A1 | 8/2008 | Iwai et al. |
| 2008/0240575 | A1 | 10/2008 | Panda et al. |
| 2008/0243878 | A1 | 10/2008 | De Spiegeleer et al. |
| 2008/0243879 | A1 | 10/2008 | Gokhale et al. |
| 2008/0243957 | A1 | 10/2008 | Prahlad et al. |
| 2008/0288338 | A1 | 11/2008 | Wiseman et al. |
| 2009/0012878 | A1 | 1/2009 | Tedesco et al. |
| 2009/0094260 | A1 | 4/2009 | Cheng et al. |
| 2009/0240735 | A1 | 9/2009 | Grandhi et al. |
| 2009/0248742 | A1 | 10/2009 | Krishnamurthy et al. |
| 2009/0304267 | A1 | 12/2009 | Tapley et al. |
| 2009/0319570 | A1 | 12/2009 | Subramanian |
| 2009/0325554 | A1 | 12/2009 | Reber |
| 2010/0015960 | A1 | 1/2010 | Reber |
| 2010/0015961 | A1 | 1/2010 | Reber |
| 2010/0015962 | A1 | 1/2010 | Reber |
| 2010/0114736 | A1 | 5/2010 | Lewis et al. |
| 2010/0241650 | A1 | 9/2010 | Chittar |
| 2011/0029334 | A1 | 2/2011 | Reber |

FOREIGN PATENT DOCUMENTS

| | | | |
|---|---|---|---|
| KR | 1020070098058 | | 10/2007 |
| KR | 100805607 | B1 | 2/2008 |
| WO | WO-2008003966 | A1 | 1/2008 |
| WO | WO-2009111047 | A2 | 9/2009 |
| WO | WO-2009111047 | A3 | 12/2009 |
| WO | WO-2009145822 | A1 | 12/2009 |

OTHER PUBLICATIONS

"U.S. Appl. No. 12/058,827 Non-Final Office Action mailed Jul. 28, 2010", 22 pgs.

"U.S. Appl. No. 12/058,827, Final Office Action mailed Nov. 23, 2010", 23 pgs.

"U.S. Appl. No. 12/058,827, Response filed Mar. 23, 2011 to Final Office Action Received Nov. 23, 2010", 13 pgs.

"U.S. Appl. No. 12/058,827, Response filed Oct. 28, 2010 to Non Final Office Action mailed Jul. 28, 2010", 17 pgs.

"U.S. Appl. No. 12/145,313 Non-Final Office Action mailed Oct. 6, 2010", 32 pgs.

"U.S. Appl. No. 12/145,313, Advisory Action mailed Apr. 21, 2011", 3 pgs.

"U.S. Appl. No. 12/145,313, Final Office Action mailed Mar. 15, 2011", 36 pgs.

"U.S. Appl. No. 12/145,313, Response filed Aug. 15, 2011 to Advisory Action mailed Apr. 21, 2011 abd Final Office Action mailed Mar. 15, 2011", 17 pgs.

"U.S. Appl. No. 12/145,313, Response filed Jan. 6, 2011 to Non Final Office Action mailed Oct. 6, 2010", 20 pgs.

"U.S. Appl. No. 12/145,313, Response filed Apr. 8, 2011 to a Final Office Action mailed Mar. 15, 2011", 22 pgs.

"U.S. Appl. No. 12/262,012 Non-Final Office Action mailed Aug. 20, 2010", 14 pgs.

"U.S. Appl. No. 12/262,012, Notice of Allowance mailed Mar. 25, 2011", 13 pgs.

"U.S. Appl. No. 12/262,012, Response filed Dec. 20, 2010 to Non Final Office Action mailed Aug. 20, 2010", 14 pgs.

"U.S. Appl. No. 12/371,882, Non Final Office Action mailed Jun. 8, 2011", 22 pgs.

"U.S. Appl. No. 12/406,016, Non Final Office Action mailed Jun. 21, 2011", 21 pgs.

"U.S. Appl. No. 12/423,655, Response filed Jul. 19, 2010 to Non Final Office Action mailed Mar. 19, 2010", 11 pgs.

"eBay Launches New Mobile Application for Consumers in Europe", [Online]. Retrieved from the internet: <URL: http://investor.ebay.com/releasedetail.cfm?ReleaseID=336380>, (2008), 1 pg.

"European Application Serial No. 09717996.4, Extended European Search Report mailed Feb. 17, 2011", 6 pgs.

"International Application Serial No. PCT/US2009/001419, Search Report mailed Sep. 30, 2009", 4 pgs.

"International Application Serial No. PCT/US2009/001419, Written Opinion mailed Sep. 30, 2009", 4 pgs.

"International Application Serial No. PCT/US2009/001976, Search Report mailed Oct. 6, 2009", 4 pgs.

"International Application Serial No. PCT/US2009/001976, Written Opinion mailed Oct. 6, 2009", 4 pgs.

"S60 Camera Phones Get Image Recognition Technology", [Online]. Retrieved from the Internet: <URL: http://news.softpedia.com/news/S60-Camera-Phones-Get-Image-Recognition-Technology-79666.shtml>, (Feb. 27, 2008), 2 pgs.

"SnapTell: Technology", [Online]. Retrieved from the Internet: <URL: http://web.archive.org/web/20071117023817/http://www.snaptell.com/technology/index.htm >, (Nov. 17, 2007), 1 pg.

"The ESP Game", [Online]. Retrieved from the Internet: <URL: http://www.espgame.org/instructions.html>, (Downloaded Nov. 13, 2007), 2 pgs.

"The Watershed Transformation", http://cmm.ensmp.fr/~beucher/wtshed.html, (Mar. 9, 2010), 1-11.

Gonsalves, Antone, "Amazon Launches Experimental Mobile Shopping Feature", [Online]. Retrieved from the Internet: <URL: http://www.informationweek.com/news/internet/retail/showArticle.jhtml?articleID=212201750&subSection=News>, (Dec. 3, 2008), 1 pg.

Huang, Zhi-Kai, et al., "Segmentation of color textures using K-means cluster based wavelet image fusion", Applied Mechanics and Materials, (Jan. 12, 2010), 209-214.

Meyer, Fernand, et al., "Multiscale Morphological Segmentations Based on Watershed, Flooding, and Eikonal PDE", Scale-Space '99, LNCS 1682, (1999), 351-362.

Parker, J.R., et al., "Algorithms for Image Processing and Computer Vision", Wiley Computer Publishing, (1997), 23-29.

Patterson, Ben, "Amazon iPhone app takes snapshots, looks for a match", [Online]. Retrieved from the Internet: <URL: http://tech.yahoo.com/blogs/patterson/30983>, (Dec. 3, 2008), 3 pgs.

Terada, S., "New cell phone services tap image-recognition technologies", [Online]. Retrieved from the Internet: <URL: http://search.japantimes.co.jp/cgi-bin/nb20070626a1.html>, (Jun. 26, 2007), 3 pgs.

Von Ahn, Luis, et al., "Labeling images with a computer game", Proceedings of the SIGCHI Conference on Human Factors in Computing Systems, (2004), 319-326.

"U.S. Appl. No. 12/406,016, Examiner Interview Summary mailed May 15, 2012", 3 pgs.

"U.S. Appl. No. 12/406,016, Response filed May 17, 2012 to Non Final Office Action mailed Feb. 29, 2012", 16 pgs.

"U.S. Appl. No. 12/406,016 , Response filed Sep. 21, 2011 to Non Final Office Action mailed Jun. 21, 2011", 17 pgs.

"U.S. Appl. No. 12/406,016, Final Office Action mailed Feb. 29, 2012", 25 pgs.

* cited by examiner

SYSTEMS AND METHODS FOR MARKETPLACE LISTINGS USING A CAMERA ENABLED MOBILE DEVICE

CROSS-REFERENCE TO RELATED APPLICATIONS

The present patent application is a continuation of U.S. patent application Ser. No. 12/262,012, filed Oct. 30, 2008, and entitled "System and Methods for Marketplace Listings Using a Camera Enabled Mobile Device," which application is incorporated herein by reference in its entirety.

FIELD

This application relates generally to data processing, and more specifically to systems and methods for marketplace listings using a camera enabled mobile device.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2008, EBAY, INC., All Rights Reserved.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Camera enabled mobile devices (such as cellular telephones) have become very popular in recent years. A camera enabled mobile device may be capable of communicating data (e.g., an image file) over wireless data networks.

BRIEF DESCRIPTION OF DRAWINGS

Embodiments are illustrated by way of example and not limitation in the figures of the accompanying drawings, in which like references indicate similar elements and in which.

DETAILED DESCRIPTION

Figure 1:
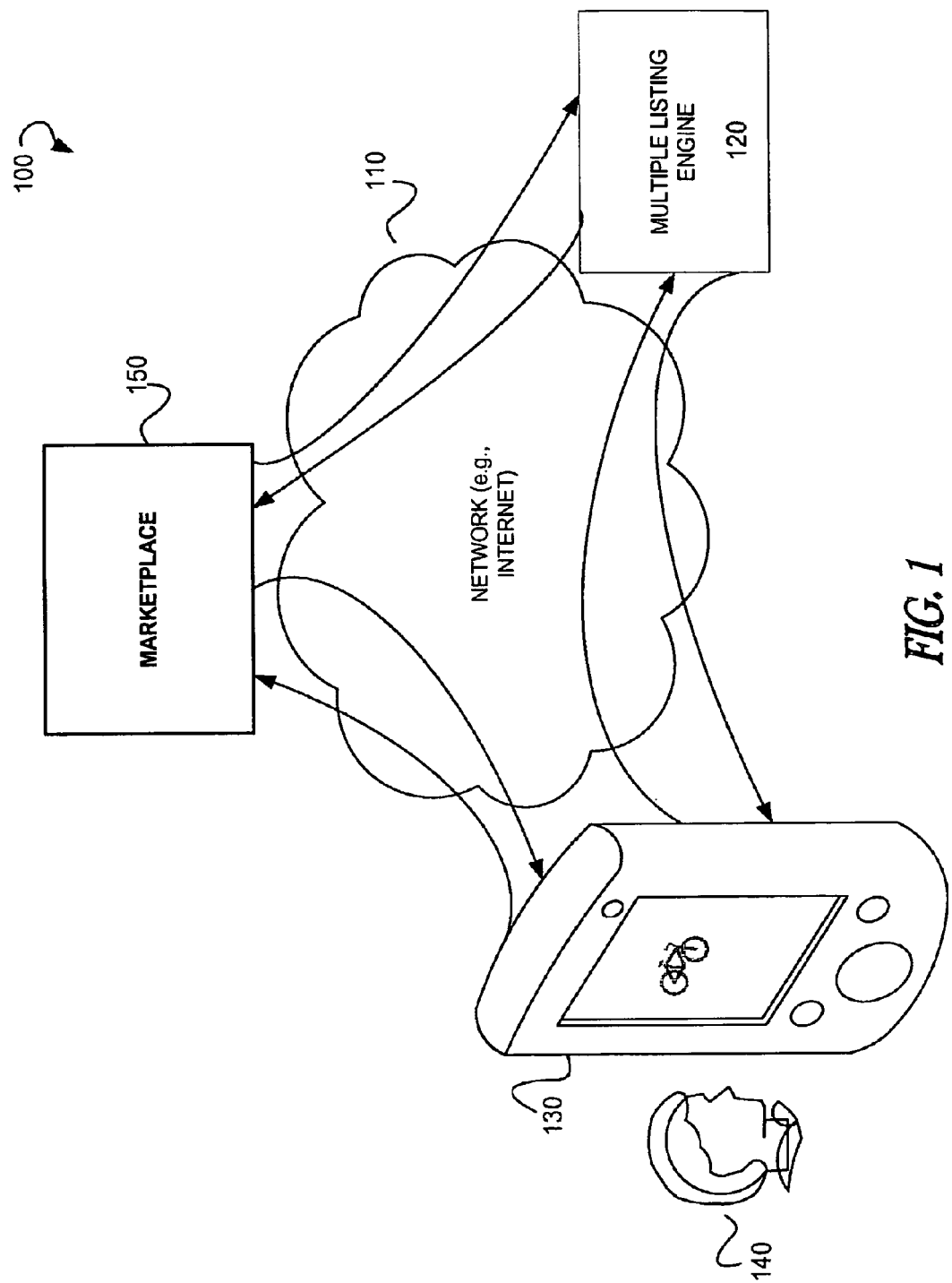
FIG. 1 is a block diagram illustrating an architecture within which systems and methods for marketplace listings using a camera enabled mobile device may be implemented, in accordance with an example embodiment.

For some example embodiments, systems and methods for creating marketplace listings using a camera enabled mobile device are disclosed. One example embodiment may comprise receiving a request via a camera enabled mobile device to list one or more sale items, receiving images having the one or more sale items, the images being taken by the camera enabled mobile device, receiving data associated with the one or more sale items, and based on the data, listing the one or more sale items on a marketplace The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments may be combined, other embodiments may be utilized, or structural, logical and electrical changes may be made without departing from the scope of what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

A camera enabled mobile device may include a mobile Operating System (OS) run on a hardware platform adapted for the OS. A camera enabled mobile device may include a Graphical User Interface (GUI), which may be based on the concept of direct manipulation of a touch screen monitor with gestures. The GUI may permit a nearly instantaneous response to user input. The gestures for interaction with the mobile OS may include swiping, tapping, pinching, and/or reverse pinching.

For some example embodiments, systems and methods for marketplace listings using a camera enabled mobile device may permit a user to take one or more pictures illustrating items to be listed on a marketplace and provide data related to the pictures. The data may be utilized to tag the items to be listed. The items may be extracted from the pictures, tagged with the data and listed at the same time. A software application running on the camera enabled mobile device may utilize rich media technology to enable a user to take multiple pictures of various items or a single picture of a group of multiple items, tag the items with data, and list the items for sale on a marketplace. In some example embodiments, a draft area may be utilized as an intermediary stage for images and data to be collected over a period of time before the data is associated with the items in the images and listed on a marketplace.

FIG. 1 illustrates a network environment 100 that may include a network 110, a multiple listing engine 120, a camera enabled mobile device 130, a user 140, and an electronic marketplace 150. The network 110 may comprise a plurality of data processing nodes interconnected for the purpose of data communication. The camera enabled mobile device 130 may comprise a camera coupled to a mobile device. The camera enabled mobile device 130, in some example embodiments, may include a Graphical User interface (GUI) which may be manipulated by gestures of a user 140's hand. In a typical GUI, instead of offering only text menus or requiring typed commands, the system presents graphical icons, visual indicators or special graphical elements called widgets that may be utilized to allow the user to interact with client applications. The camera enabled mobile device 130 may be configured to utilize icons in conjunction with text, labels or text navigation to fully represent the information and actions available to users. Example GUI and client applications are described in more detail with reference to FIG. 3.

The user 140 is a person interacting with the camera enabled mobile device 130 via the GUI. In some other embodiments, the user 140 may be represented by an automated process designed to simulate a person operating the camera enabled device 130. The electronic marketplace 150, in the context of the example network environment 100, may be an online auction and fixed price shopping website configured to permit individual users and businesses to buy and sell goods and services (e.g., eBay). The electronic marketplace 150 may be a part of the worldwide electronic commerce which includes buying and selling of products or services over electronic systems such as the Internet and other computer networks. The multiple listing engine 120, in some example embodiments, may include various components facilitating listing of items for sale. A system for marketplace listings using a camera enabled mobile device 200 is described by way of example with reference to FIG. 2.

Figure 2:
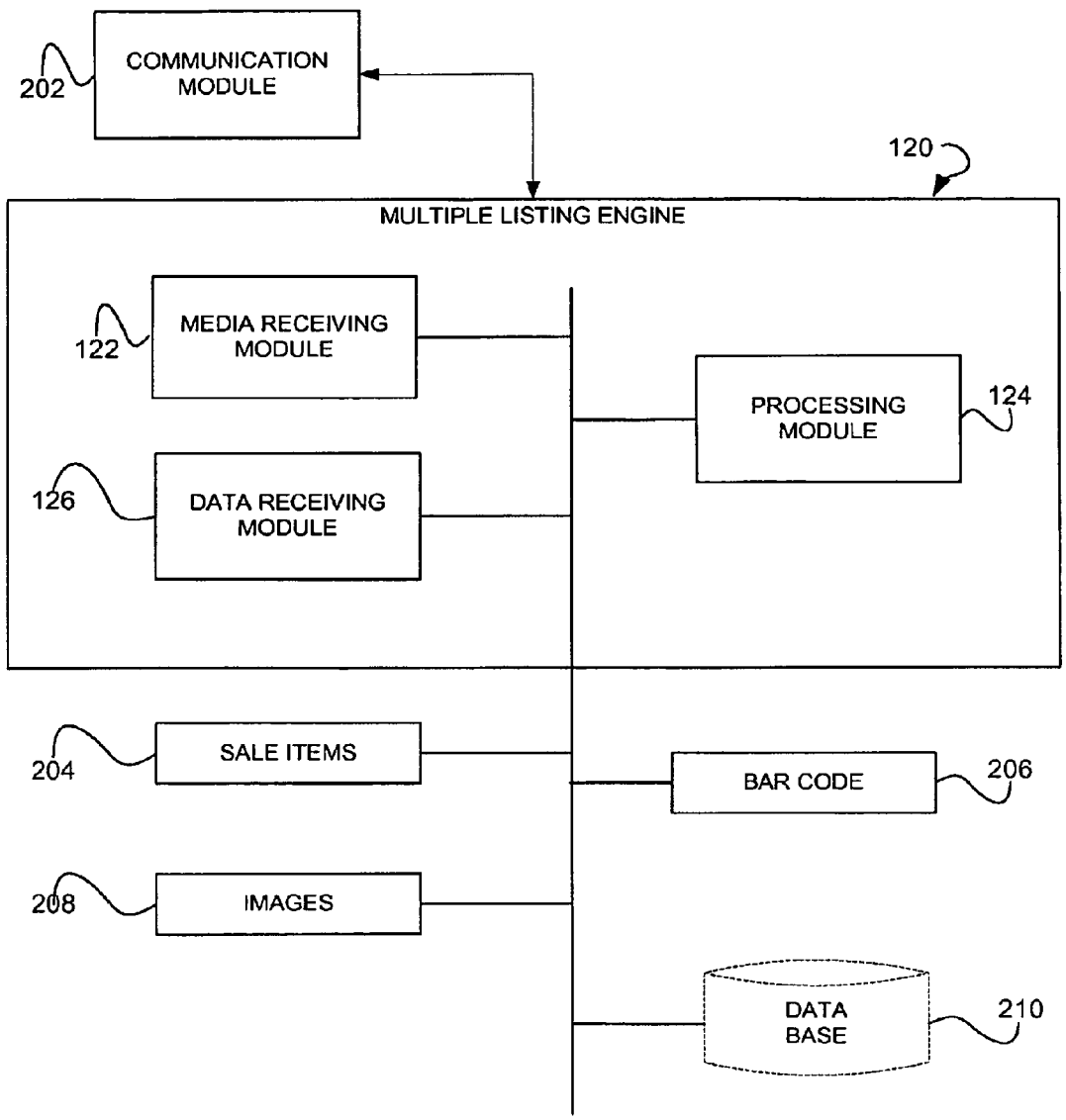
FIG. 2 is a block diagram showing a multiple listing engine, in accordance with an example embodiment.

FIG. 2 is a block diagram showing the system for marketplace listings using a camera enabled mobile device in accordance with an example embodiment. The system for marketplace listings using a camera enabled mobile device in some example embodiments may include a communication module 202 coupled to a multiple listing engine 120. The system for marketplace listings using a camera enabled mobile device may further include sale items 204, a bar code 206, images 208, and a database 210.

The communication module 202, in some example embodiments, may be configured to receive a request from the camera enabled mobile device 130 to list one or more the sale items 204 selected by a user from the images 208. For some example embodiments, user interaction may not be needed because the sale items 204 are selected based on predetermined default criteria. The communication module 202 may be coupled to the multiple listing engine 120, which in turn includes a media receiving module 122, a processing module 124, and a data receiving module 126.

The media receiving module 122, in some example embodiments, may be configured to receive the images 208. The images 208 may be taken by the user 140 operating the camera enabled mobile device 130. The images 208 may include the sale items 204. For example, the user 140 may be willing to sell multiple items located in his garage. The user 140 may utilize the camera enabled mobile device 130 to take the images 208 in his garage so that each image includes a plurality of the sale items 204. The data receiving module 126 may be configured to receive data associated with the sale items 204. The data may be provided by the user 140 or created automatically based on the images 208.

The processing module 124, in some example embodiments, may be configured to list the sale items 204 for sale. The sale items 204 are extracted from the images 208 received by the media receiving module 122 and the data received by the data receiving module 126. The processing module 124, in some example embodiments, may be configured to provide default data when no data is provided by the user. For example, if the user 140 provides no data and the sale items 204 are of low value, the processing module 124 may associate the sale items 204 with default data. For some example embodiments, the sale items 204 may be classified automatically with help of image recognition technology. Additionally, a light weight listing process may be utilized in which the user 140 may be provided with a few options. This approach may provide the multiple listing engine 120 with the data sufficient to list the sale item 204.

The database 210, in some example embodiments, may be configured as a structured collection of records or data that is stored in a computer system which a computer program or a person using a query language may consult to answer queries. The records retrieved in answer to queries are information that can be used to make decisions. The database 210 may store the images 208 as well as the sale items 204. The sale items 204 may include goods and/or services which are shown in the images 208 provided by the camera enabled mobile device 130 and listed on the marketplace 150 by the multiple listing engine 120.

For some example embodiments, the bar code 206 may be utilized to provide the data needed for the sale items 204 to be listed on the marketplace 150. The bar code 206 may be, for example, a Universal Product Code (UPC), which is widely used for tracking sale items 204. Thus an image of the bar code 206 may be utilized to generate tags describing the sale items 204. The images 208, in some example embodiments, are photographs of the sale items 204. Each image of the images 208 may include more than one item.

Figure 3:
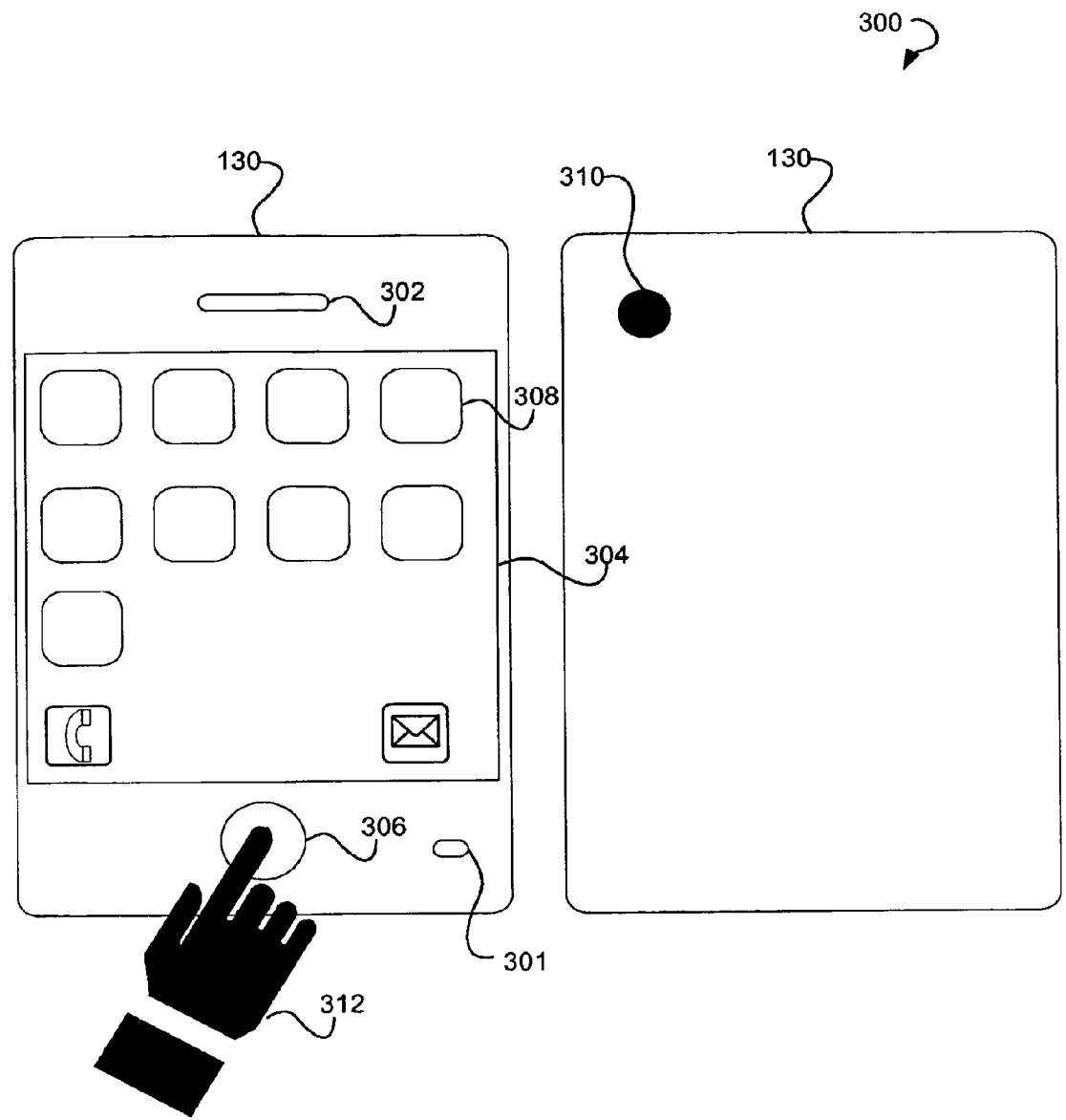
FIG. 3 is a block diagram showing back and front views of a camera enabled mobile device, in accordance with an example embodiment.

FIG. 3 is a block diagram 300 showing back and front views of the camera enabled mobile device 130, in accordance with an example embodiment. The camera enabled mobile device 130, in some example embodiments, includes a receiver 301, a speaker 302, and a touch screen 304. The touch screen 304 may display a GUI, which in turn includes application icons 308. The camera enabled mobile device 130 may further include a home button 306 and a camera 310, which is shown on the back view of the camera enabled mobile device 130 but may, as well, be located in the front. Also shown is a hand 312 of the user 140 which may operate the camera enabled mobile device 130 by manipulating the camera enabled mobile device 130 through gestures of the hand 312.

For some example embodiment, because the camera enabled mobile device 130 has native camera integration, the user 140 may utilize the camera enabled mobile device 130 for various applications adapted to take advantage of this functionality. For example, a user 140 may take a picture of the bar code 206 associated with a sale item. An application adapted to read the bar code 206 may determine generated data descriptive of the sale item based on the picture of the bar code 206. The data may be utilized in listing of the item by the multiple listing engine 120 or in a search for similar items on the marketplace 150. Then the search results may be analyzed and displayed (e.g., average price of the product). The search result may be utilized in tagging the sale items 204.

In some example embodiments, the camera enabled mobile device 130 may permit listing of the sale items 204 based on an image of the item and a minimal description. In some example embodiments, in order for the user 140 to receive data, the user may be offered a selection of choices. In further example embodiments, before the sale items 204 are listed on the marketplace 150, the images 208 and related data are compiled in a personal draft area. Thus, the user 140 may take a picture, add some tags to the picture, and then place the picture and the tags in the personal draft area.

The receiver 301 may be a device for converting sound into electric signals and vice versa. The touch screen 304, in some example embodiments, is a display which may detect the presence and location of a touch within the display area. The touch screen 304 may be operated by touch or contact to the display of the device by a finger or hand. In some example embodiments, the touch screen 304 may sense other objects, such as a stylus. The home button 306, in some example embodiments, may be a button that permits a user to see the icons 308. The icons 308 may be utilized to start software applications installed on the camera enabled mobile device 130.

A web application running on the camera enabled mobile device 130 is an example of a software application that may be started with one of the icons 308. A web application running on the camera enabled mobile device 130 may employ generic web technologies that do not take advantage of the native capabilities of the camera enabled mobile device 130. The web application may also mix HyperText Markup Language (HTML) content with native content. Further example applications running on the camera enabled mobile device 130 may be designed for instant notifications or real time alerts of users of the camera enabled mobile device 130. Camera 310 is a device used to capture images, either as still photographs or as sequences of moving images (movies or videos).

Figure 4:
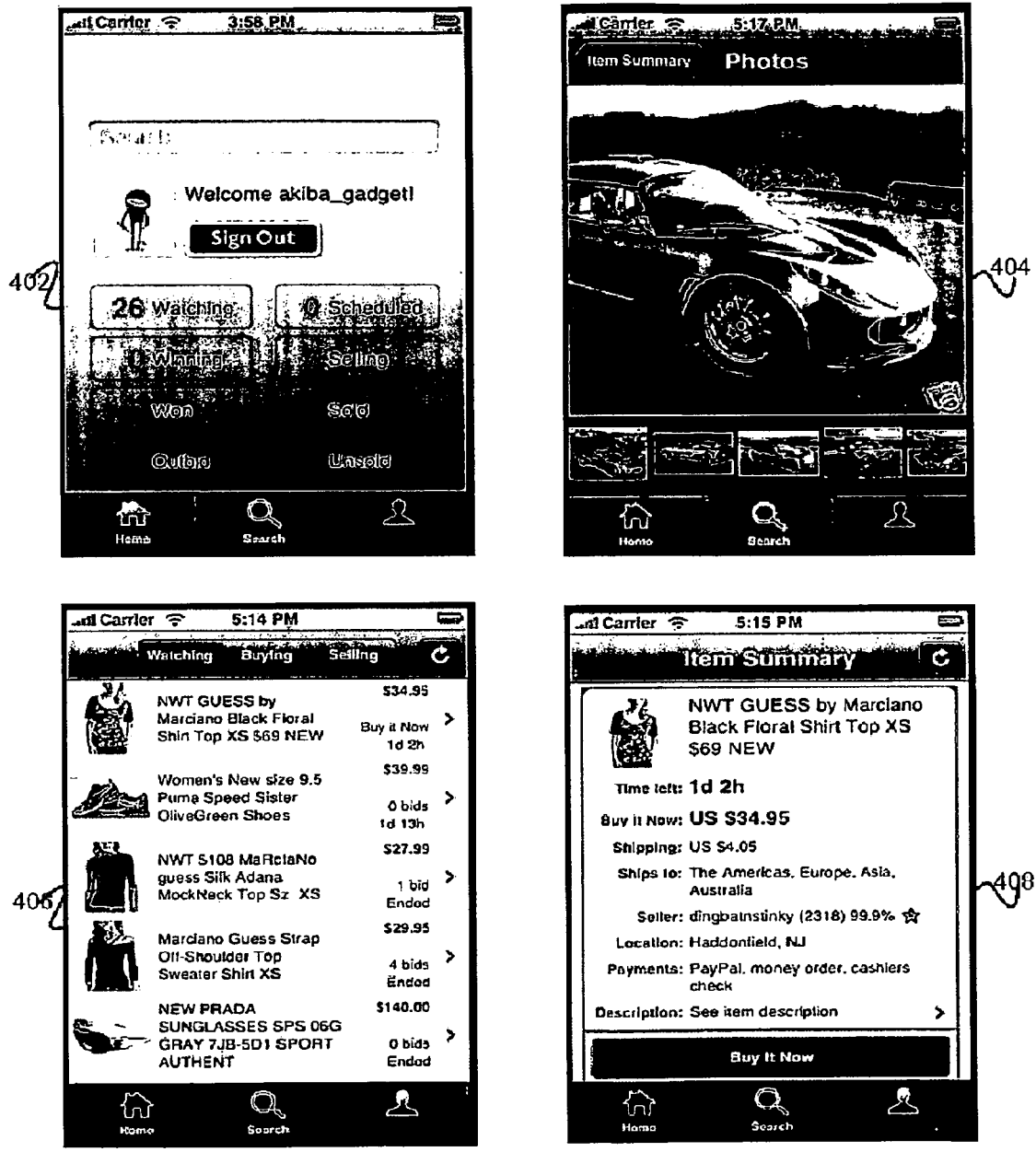
FIG. 4 is screenshots showing marketplace listings displayed on a camera enabled mobile device, in accordance with an example embodiment.

FIG. 4 illustrates several screenshots showing marketplace listings displayed on the camera enabled mobile device 130, in accordance with an example embodiment. The screenshots may include a user status view 402, photos 404, multiple listings 406, and an item summary 408. The user status view 402 may include statistics for a particular user such as items listed for sale as well as the items that the user is interested in or is bidding bid on. As can be seen from the example user status view 402, the user is currently "watching" 25 items and selling 7 items. Furthermore, the user has won 5 items he was bidding on was outbid for 2 items. The photos 404 show images that may be taken by the camera enabled mobile device 130 and are currently stored on the camera enabled mobile device 130 or in the user's draft area. The multiple listings 406 shows items that may have been extracted from the images 208 and tagged with the data received from the user 140. The items may be extracted from multiple images or from one image, taken in one or more sessions. The item summary 408 shows the summary of one item shown in the multiple listings 406.

Figure 5:
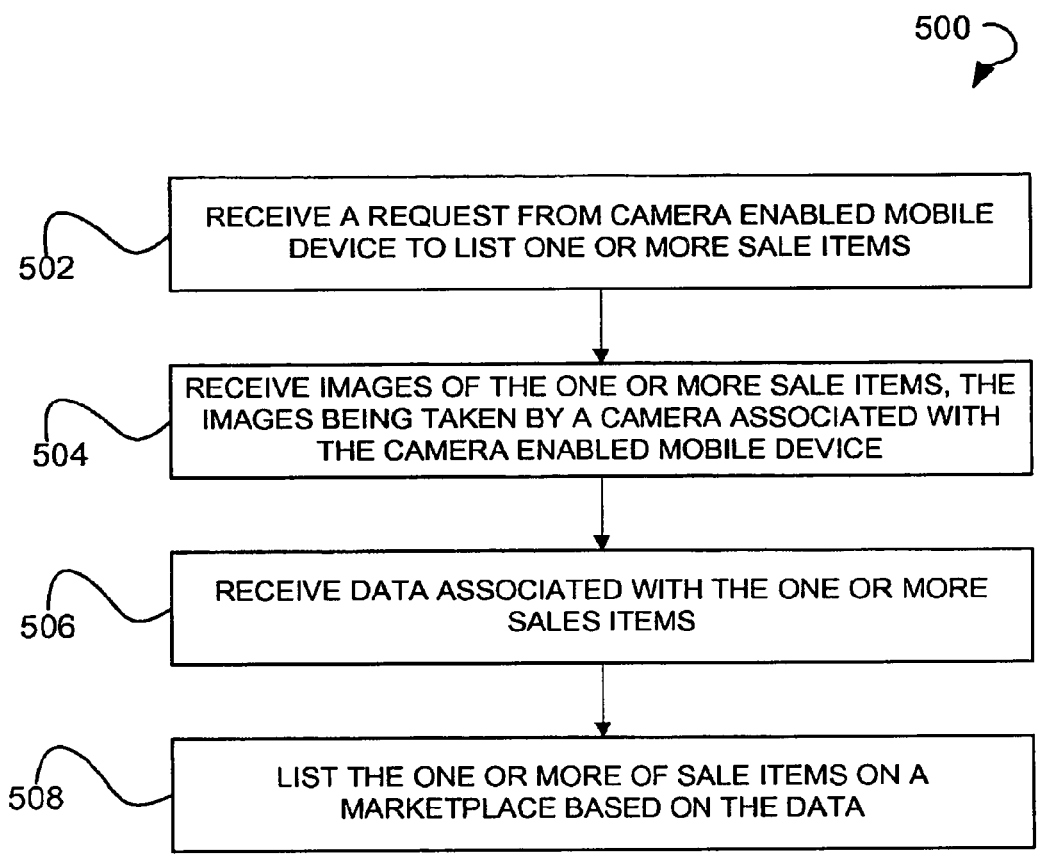
FIG. 5 is a flow chart illustrating a method for marketplace listings using a camera enabled mobile device, in accordance with an example embodiment.

FIG. 5 illustrates an example method 500 for marketplace listings using the camera enabled mobile device 130. The method 500 may be performed by processing logic that may comprise hardware (e.g., dedicated logic, programmable logic, microcode, etc.), software (such as run on a general purpose computer system or a dedicated machine), or a combination of both in one example embodiment, the processing logic resides at the multiple listing engine 120, illustrated in FIG. 2. The method 500 may be performed by the various example modules discussed above with reference to FIG. 2. Each of these modules may comprise processing logic.

As shown in FIG. 5, the method 500 may commence at operation 502, with the communication module 202 receiving a request from the camera enabled mobile device 130 to list one or more sale items 204 on the marketplace 150. At operation 504, the media receiving module 122 of the multiple listing engine 120 may receive images of the one or more sale items 204. At operation 506, the data receiving module 126 may receive data associated with the one or more sale items 204, and at operation 508, the processing module 124 may list the one or more sale items 204 based on the data received at operation 506. A further example method for marketplace listings using a camera enabled mobile device 130 is described with reference to FIG. 6 and FIG. 7.

Figure 6:
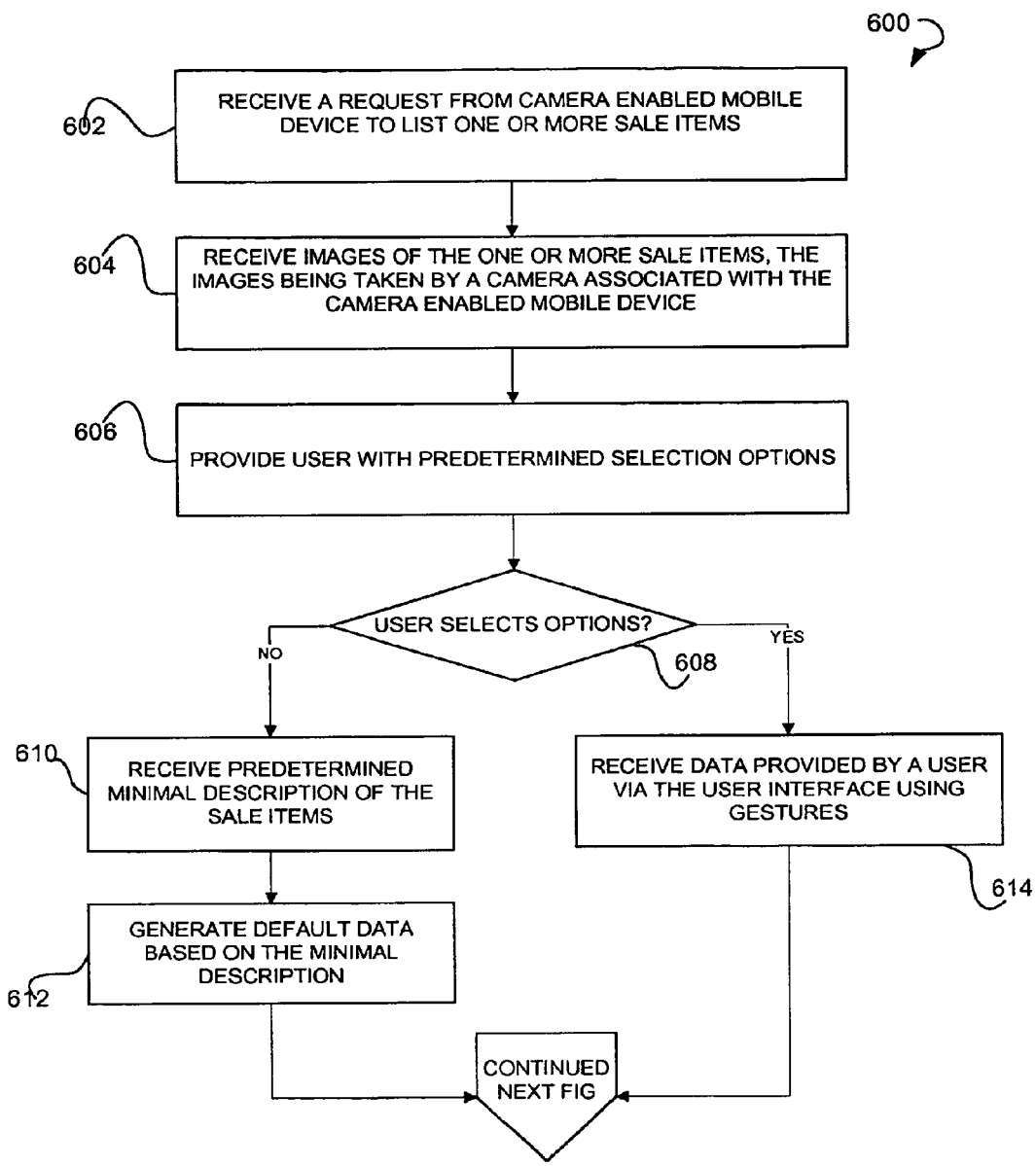
FIG. 6 is the first part of a flow chart illustrating a further method for marketplace listings using a camera enabled mobile device, in accordance with an example embodiment.

FIG. 6 is the first part of a flow chart illustrating a further method 600 for marketplace listings using a camera enabled mobile device, in accordance with an example embodiment. As shown in FIG. 6, the method 600 may commence at operation 602 with the communication module 202 receiving a request from the camera enabled mobile device 130 to list one or more sale items 204. At operation 604, the media receiving module 122 may receive images of the one or more sale items 204. The images received by the media receiving module 122 may be taken by the camera enabled mobile device 130. The processing module 124 may need data to tag the sale items 204. The data may be supplied by a user or derived using some predetermined methods. The user may be explicitly asked to provide the data. Thus, at operation 606, the processing module 124 may provide the user 140 with predetermined selection options. For example, a message may be displayed asking the user whether an item shown in the image is a certain product. Other questions may be asked.

At the decision block 608, it may be determined by the processing module 124 whether or not the user 140 selects an offered option. If the user 140 selects an option, the processing module 124 may receive the data provided by the user 140 at operation 614. The data may be provided via the GUI of the camera enabled mobile device 130 using various supported gestures. The GUI of the camera enabled mobile device 130 may support direct manipulations including one or more of the following gestures: multi-touching, swiping, tapping, pinching, and reverse pinching. If, on the other hand, it is determined at decision block 608 that the user 140 did not select any options, the processing module 124 may receive, at operation 610, an automatically-generated minimal description of the sale items 204. At operation 612, the processing module 124 may generate default data based on the minimal description received at operation 610.

Figure 7:
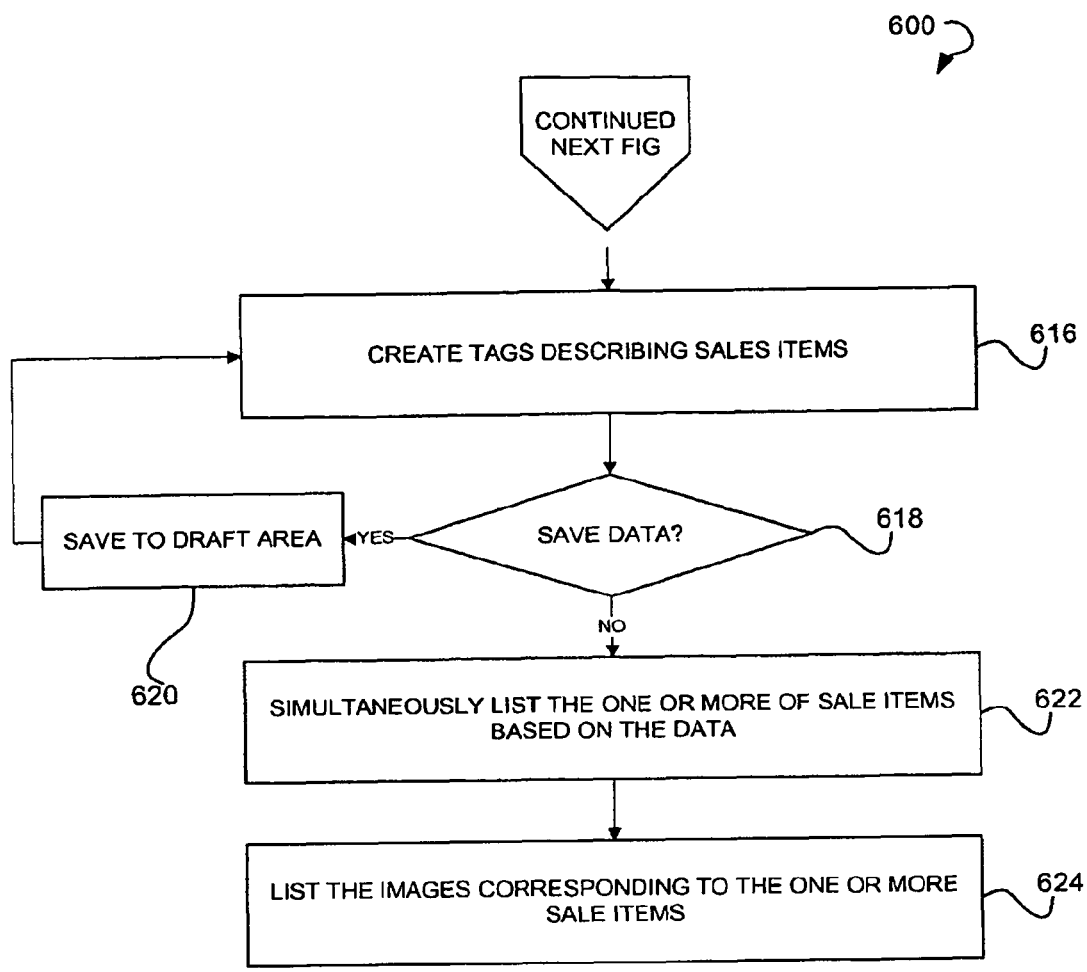
FIG. 7 is the second part of a flow chart illustrating a further method for marketplace listings using a camera enabled mobile device, in accordance with an example embodiment.

FIG. 7 is the second part of a flow chart illustrating the further method 600 for marketplace listings using the camera enabled mobile device 130, in accordance with an example embodiment. As shown in FIG. 7, the method 600 may continue with creating tags describing the sale items 204 at operation 616. The flow may proceed to decision block 618 where it may be determined whether the data needs to be saved to a personal draft area before the items are listed on a marketplace. If it is determined that the data needs to be saved to the draft area, the data may be by saved at operation 620. This approach may be taken when it is determined that an intermediary step of compiling the images and the data in a draft area may be needed. If, on the other hand, it is determined that the data does not need to be saved, the method may proceed to list simultaneously the one or more sale items 204 based on the data available at operation 622. Thereafter, the images corresponding to the one or more sale items 204 may be listed alongside the sale items 204 at operation 624. It will be noted that the approach described is not limited to photographs and may extend to video and audio.

Figure 8:
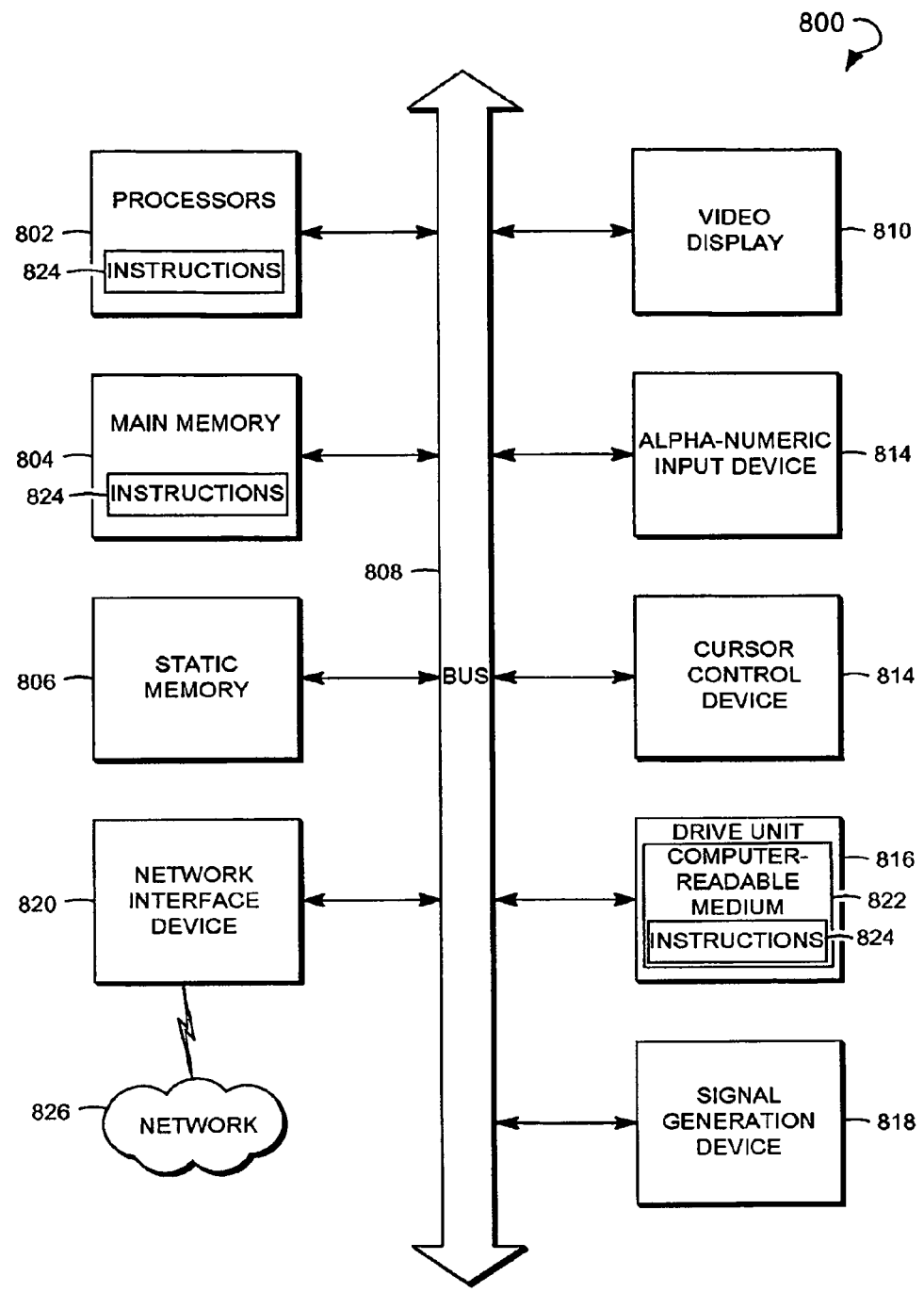
FIG. 8 is a diagrammatic representation illustrating an example machine in the form of a computer system within which a set of instructions for causing the machine to perform any one or more of the methodologies discussed herein may be executed.

Proceeding to FIG. 8, the example computer system 800 includes a processor or multiple processors 802 (e.g., a central processing unit (CPU), a graphics processing unit (GPU), or both), a main memory 804 and a static memory 806, which communicate with each other via a bus 808. The computer system 800 may further include a video display unit 810 (e.g., a liquid crystal display (LCD) or a cathode ray tube (CRT)). The computer system 800 may also include an alphanumeric input device 812 (e.g., a keyboard), a cursor control device 814 (e.g., a mouse), a disk drive unit 816, a signal generation device 818 (e.g., a speaker) and a network interface device 820.

The disk drive unit 816 includes a computer-readable medium 822, on which is stored one or more sets of instructions and data structures (e.g., instructions 824) embodying or utilized by any one or more of the methodologies or functions described herein. The instructions 824 may also reside, completely or at least partially, within the main memory 804 and/or within the processors 802 during execution thereof by the computer system 800. The main memory 804 and the processors 802 may also constitute machine-readable media.

The instructions 824 may further be transmitted or received over a network 826 via the network interface device 820 utilizing any one of a number of well-known transfer protocols (e.g., Hyper Text Transfer Protocol (HTTP)).

While the computer-readable medium 822 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAMs), read only memory (ROMs), and the like.

The example embodiments described herein may be implemented in an operating environment comprising software installed on a computer, in hardware, or in a combination of software and hardware.

Thus, systems and methods for marketplace listings using a camera enabled mobile device have been described. Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

What is claimed is:

1. A computer-implemented method, comprising:
   receiving a request via a camera enabled mobile device to list one or more sale items;
   receiving an image depicting a plurality of potential sale items, the image being taken by the camera enabled mobile device;
   performing image recognition, by at least one processor, on the received image to identify the one or more sale items from the plurality of potential sale items within the received image;
   automatically generating, by the at least one processor, a set of descriptive data for the one or more sale items based on the identification of the one or more sale items depicted in the image; and
   listing the one or more sale items on a marketplace using the image and the automatically generated set of descriptive data.

2. The computer-implemented method of claim 1, wherein the received image includes at least one barcode for the one or more sale items.

3. The computer-implemented method of claim 2, wherein performing image recognition on the received image includes decoding the at least one bar code for the one or more sale items.

4. The computer-implemented method of claim 3, wherein automatically generating a set of descriptive data includes using the at least one decoded bar code for the one or more sale items to provide descriptive data for each of the corresponding one or more items.

5. The computer-implemented method of claim 1, wherein performing image recognition on the received image includes:
   extracting from the image the one or more sale items; and
   classifying the one or more sale items.

6. The computer-implemented method of claim 1, wherein listing the one or more sale items includes:
   associating the one or more sale items with corresponding descriptive data from the set of descriptive data; and
   listing the one or more sale items accompanied with the corresponding descriptive data on the marketplace.

7. The computer-implemented method of claim 1, further comprising querying a user via a user interface of the camera enabled mobile device for additional descriptive data for the one or more items depicted in the image.

8. The computer-implemented method of claim 7, wherein querying the user for the additional descriptive data includes querying the user to confirm that an item shown in the image is a certain product.

9. The computer-implemented method of claim 1, further including:
   generating a draft listing for each sale item of the one or more sale items identified within the received image, the draft listing including the corresponding set of descriptive data describing the sale item of the one or more sale items.

10. The computer-implemented method of claim 9, further including:
    sending, to the mobile device, a list of draft listings;
    receiving, from the mobile device, a selection of draft listings from the list of draft listings; and
    wherein the listing of the one or more sale items includes publishing at least a portion of the draft listings based on the selection received from the mobile device.

11. A system, comprising:
    at least one processor;
    a communication module, implemented by the at least one processor, configured to receive a request via a camera enabled mobile device to list one or more sale items; and
    a multiple listing engine, implemented by the at least one processor, configured to:
       receive an image depicting a plurality of potential sale items, the image being taken by the camera enabled mobile device;

perform image recognition on the received image to identify the one or more sale items from the plurality of potential sale items within the received image;

automatically generate a set of descriptive data for the one or more sale items based on the identification of the one or more sale items depicted in the image; and list the one or more sale items on a marketplace using the image and the automatically generated set of descriptive data.

12. The system of claim 11, wherein the image received includes at least one barcode for the one or more sale items.

13. The system of claim 12, wherein the multiple listing engine is further configured to decode the at least one bar code for the one or more sale items.

14. The system of claim 13, wherein the multiple listing engine is further configured to use the at least one decoded bar code for the one or more sale items to provide descriptive data for each of the corresponding one or more items.

15. The system of claim 11, wherein the multiple listing engine is configured to perform image recognition on the received image by:

extracting from the image the one or more sale items; and classifying the one or more sale items.

16. The system of claim 11, wherein the multiple listing engine is configured to list the one or more sale items by:

associating the one or more sale items with corresponding descriptive data from the set of descriptive data; and listing the one or more sale items accompanied with the corresponding descriptive data on the marketplace.

17. The system of claim 11, wherein the multiple listing engine is further configured to query a user via a user interface of the camera enabled mobile device for additional descriptive data for the one or more items depicted in the image.

18. The system of claim 17, wherein the multiple listing engine is further configured to query the user to confirm that an item shown in the image is a certain product.

19. A computer-readable storage medium storing a set of instructions that, when executed by one or more processors, causes the one or more processors to perform the following operations comprising:

receiving a request via a camera enabled mobile device to list one or more sale items;

receiving an image depicting a plurality of potential sale items, the image being taken by the camera enabled mobile device;

performing image recognition on the received image to identify the one or more sale items from the plurality of potential sale items within the received image;

automatically generating a set of descriptive data for the one or more sale items based on the identification of the one or more sale items depicted in the image; and listing the one or more sale items on a marketplace using the image and the automatically generated set of descriptive data.

20. The computer-readable storage medium of claim 19, wherein the received image includes at least one barcode for the one or more sale items.

21. The computer-readable storage medium of claim 20, wherein performing image recognition on the received image includes decoding the at least one bar code for the one or more sale items.

22. The computer-readable storage medium of claim 21, wherein automatically generating the set of descriptive data includes using the at least one decoded bar code for the one or more sale items to provide descriptive data for each of the corresponding one or more items.

* * * * *

UNITED STATES PATENT AND TRADEMARK OFFICE
CERTIFICATE OF CORRECTION

PATENT NO. : 8,321,293 B2
APPLICATION NO. : 13/175641
DATED : November 27, 2012
INVENTOR(S) : Lewis et al.

Page 1 of 2

It is certified that error appears in the above-identified patent and that said Letters Patent is hereby corrected as shown below:

Title Page, item (56);

On page 2, in column 2, under "Other Publications", line 1, after "12/058,827", insert --,--, therefor On page 2, in column 2, under "Other Publications", line 6, delete "Received" and insert --mailed--, therefor On page 2, in column 2, under "Other Publications", line 9, after "12/145,313", insert --,--, therefor On page 2, in column 2, under "Other Publications", line 15, delete "Aug. 15, 2011" and insert --Jun. 15, 2011--, therefor On page 2, in column 2, under "Other Publications", line 16, delete "abd" and insert --and--, therefor On page 2, in column 2, under "Other Publications", line 20, after "to", delete "a", therefor On page 2, in column 2, under "Other Publications", line 22, after "12/262,012", insert --,--, therefor On page 3, in column 1, under "Other Publications", line 20, delete "J.R.," and insert --J. R.,--, therefor On page 3, in column 2, under "Other Publications", line 15, delete "12/406,016 ," and insert --12/406,016,--, therefor Signed and Sealed this
Twelfth Day of March, 2013

Teresa Stanek Rea
*Acting Director of the United States Patent and Trademark Office*

CERTIFICATE OF CORRECTION (continued)
U.S. Pat. No. 8,321,293 B2

In the drawings, Sheet 8 of 8, Fig. 8, first occurrence, reference numeral 814, delete "814" and insert --812,--, therefor In column 1, line 31, delete "EBAY, INC.," and insert --EBAY INC.,--, therefor In column 2, line 24, after "marketplace", insert --.--, therefor In column 2, line 49, delete "document;" and insert --document,--, therefor In column 3, line 16, delete "interface" and insert --Interface--, therefor In column 5, line 37, delete "stilt" and insert --still--, therefor In column 5, line 66, delete "both in" and insert --both. In--, therefor In column 6, line 60, after "be", delete "by", therefor In column 8, line 13, in Claim 2, delete "barcode" and insert --bar code--, therefor In column 9, line 11, in Claim 12, delete "barcode" and insert --bar code--, therefor In column 10, line 22, in Claim 20, delete "barcode" and insert --bar code--, therefor